US009568645B2

(12) United States Patent
Chang et al.

(10) Patent No.: US 9,568,645 B2
(45) Date of Patent: Feb. 14, 2017

(54) SILICONE HYDROGEL LENSES WITH RELATIVELY-LONG THERMAL STABILITY

(71) Applicant: Novartis AG, Basel (CH)

(72) Inventors: Frank Chang, Cumming, GA (US); Jinyu Huang, Suwanee, GA (US); Ryan DeSousa, Atlanta, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 14/496,492

(22) Filed: Sep. 25, 2014

(65) Prior Publication Data
US 2015/0092155 A1  Apr. 2, 2015

Related U.S. Application Data

(63) Continuation-in-part of application No. 14/494,186, filed on Sep. 23, 2014.

(60) Provisional application No. 61/884,176, filed on Sep. 30, 2013, provisional application No. 61/884,181, filed on Sep. 30, 2013.

(51) Int. Cl.
G02B 1/04 (2006.01)
B29D 11/00 (2006.01)
B29K 83/00 (2006.01)
B29K 105/00 (2006.01)
B29K 105/24 (2006.01)

(52) U.S. Cl.
CPC ......... *G02B 1/043* (2013.01); *B29D 11/00134* (2013.01); *B29K 2083/005* (2013.01); *B29K 2105/0005* (2013.01); *B29K 2105/0061* (2013.01); *B29K 2105/24* (2013.01)

(58) Field of Classification Search
USPC .................... 523/107; 264/1.38; 351/159.33
See application file for complete search history.

(56) References Cited

U.S. PATENT DOCUMENTS

| 3,162,676 | A  | 12/1964 | Goldberg |
|-----------|----|---------|----------|
| 3,299,173 | A  | 1/1967  | Roselli  |
| 4,312,575 | A  | 1/1982  | Peyman   |
| 4,444,711 | A  | 4/1984  | Schad    |
| 4,460,534 | A  | 7/1984  | Boehm    |
| 4,528,311 | A  | 7/1985  | Beard    |
| 4,612,358 | A  | 9/1986  | Besecke  |
| 4,632,844 | A  | 12/1986 | Yanagihara |
| 4,716,234 | A  | 12/1987 | Dunks    |
| 4,835,312 | A  | 5/1989  | Itoh     |
| 5,508,317 | A  | 4/1996  | Muller   |
| 5,760,100 | A  | 6/1998  | Nicolson |
| 5,789,464 | A  | 8/1998  | Muller   |
| 5,843,346 | A  | 12/1998 | Morrill  |
| 5,849,810 | A  | 12/1998 | Muller   |
| 5,849,811 | A  | 12/1998 | Nicolson |
| 5,894,002 | A  | 4/1999  | Boneberger |
| 6,039,913 | A  | 3/2000  | Hirt     |
| 6,367,929 | B1 | 4/2002  | Maiden   |
| 6,451,871 | B1 | 9/2002  | Winterton |
| 6,627,124 | B1 | 9/2003  | Herbrechtsmeier |
| 6,719,929 | B2 | 4/2004  | Winterton |
| 6,793,973 | B2 | 9/2004  | Winterton |
| 6,800,225 | B1 | 10/2004 | Hagmann  |
| 6,811,805 | B2 | 11/2004 | Gilliard |
| 6,822,016 | B2 | 11/2004 | McCabe   |
| 6,896,926 | B2 | 5/2005  | Qiu      |
| 7,091,283 | B2 | 8/2006  | Mueller  |
| 7,238,750 | B2 | 7/2007  | Mueller  |
| 7,268,189 | B2 | 9/2007  | Mueller  |
| 7,384,590 | B2 | 6/2008  | Kelly    |
| 7,387,759 | B2 | 6/2008  | Kelly    |
| 7,521,519 | B1 | 4/2009  | Hirt     |
| 7,605,190 | B2 | 10/2009 | Moszner  |
| 7,858,000 | B2 | 12/2010 | Winterton |
| 8,147,897 | B2 | 4/2012  | Ferreiro |
| 8,153,703 | B2 | 4/2012  | Laredo   |
| 8,163,206 | B2 | 4/2012  | Chang    |
| 8,232,326 | B2 | 7/2012  | Laredo   |
| 8,409,599 | B2 | 4/2013  | Wu       |
| 8,431,624 | B2 | 4/2013  | Domschke |
| 8,480,227 | B2 | 7/2013  | Qiu      |
| 8,557,940 | B2 | 10/2013 | Chang    |
| 2008/0015315 | A1 | 1/2008  | Chang  |
| 2008/0143003 | A1 | 6/2008  | Phelan |
| 2008/0143958 | A1 | 6/2008  | Medina |
| 2008/0231798 | A1 | 9/2008  | Zhou   |
| 2008/0234457 | A1 | 9/2008  | Zhou   |
| 2008/0277814 | A1 | 11/2008 | Moszner |
| 2010/0249356 | A1 | 9/2010  | Rathore |
| 2011/0063567 | A1 | 3/2011  | Domschke |
| 2011/0134387 | A1 | 6/2011  | Samuel |
| 2012/0026457 | A1 | 2/2012  | Qiu    |
| 2012/0029111 | A1 | 2/2012  | Chang  |
| 2012/0088843 | A1 | 4/2012  | Chang  |
| 2012/0088844 | A1 | 4/2012  | Kuyu   |
| 2012/0088861 | A1 | 4/2012  | Huang  |
| 2013/0118127 | A1 | 5/2013  | Kolluru |
| 2014/0171539 | A1 | 6/2014  | Chang  |
| 2014/0171542 | A1 | 6/2014  | Chang  |
| 2015/0094393 | A1 | 4/2015  | Holland |

FOREIGN PATENT DOCUMENTS

| EP | 1905415 B1 | 7/2009 |
| EP | 213622 B1  | 8/2012 |

(Continued)

OTHER PUBLICATIONS

PCT International Search Report dated Dec. 17, 2014, International Application No. PCT/US2014/057442, International Filing Date Sep. 25, 2014.

(Continued)

*Primary Examiner* — Tae H Yoon

(74) *Attorney, Agent, or Firm* — Jian Zhou

(57) ABSTRACT

The invention provides silicone hydrogel ophthalmic lenses (in particular contact lenses) having relatively-long thermal stability and methods for making such ophthalmic lenses.

6 Claims, No Drawings

(56) References Cited

FOREIGN PATENT DOCUMENTS

| WO | 2010071691 A1 | 6/2010 |
|---|---|---|
| WO | 2014093772 A1 | 6/2014 |

OTHER PUBLICATIONS

PCT Written Opinion of the International Searching Authority dated Dec. 17, 2014, International Application No. PCT/US2014/057442, International Filing Date Sep. 25, 2014.

Winterton et al., The Cornea: Transactions of the World Congress on the Cornea 111, H.D. Cavanagh Ed., Raven Press: New York 1988, pp. 273-280.

Durmaz, Y.Y. et. al, Visible Light Initiated Free Radical Promoted Cationic Polymerization Using Acylgermane Based Photoinitiator in the Presence of Onium Salts, Macromolecules 2008, 41, 6714-6718.

Ganster, B. et. al, New Photocleavable Structures. Diacylgermane-Based Photoinitiators for Visible Light Curing, Macromolecules 2008, 41, 2394-2400.

Moszner, N. et al, Benzoyl germanium Derivatives as Novel Visible Light Photoinitiators for Dental Materials, Dental Materials 2008, 24, 901-907.

Moszner, N. et al, Benzoylgermanium Derivatives as Novel Visible-Light Photoinitiators for Dental Composites, Macromolecular Materials Engineering 2009, 294, 877-886.

Tehfe, M. et. al, Bis(germyl)ketones: Toward a New Class of Type I Photoinitiating Systems Sensitive Above 500 nm?a, Macromolecular Rapid Communications 2010, 31, 473-478.

PCT International Search Report dated Dec. 17, 2015, International Application No. PCT/US2014/057019, International Filing Date Sep. 23, 2014.

PCT Written Opinion of the International Searching Authority dated Dec. 17, 2015, International Application No. PCT/US2014/057019, International Filing Date Sep. 23, 2014.

US 9,568,645 B2

SILICONE HYDROGEL LENSES WITH RELATIVELY-LONG THERMAL STABILITY

This application claims the benefits under 35 USC §119 (e) of U.S. provisional application Nos. 61/884,176 and 61/884,181 filed Sep. 30, 2013, and is continuation-in-part of U.S. patent application Ser. No. 14/494,186 filed Sep. 23, 2014, incorporated by reference in their entireties.

The present invention is related to silicone hydrogel ophthalmic lenses (in particular contact lenses) having a relatively-long thermal stability and methods for making such ophthalmic lenses.

BACKGROUND

In recent years, soft silicone hydrogel contact lenses become more and more popular because of their high oxygen permeability and comfort. "Soft" contact lenses can conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. By having high oxygen permeability, a silicone hydrogel contact lens allows sufficient oxygen permeate through the lens to the cornea and to have minimal adverse effects on corneal health.

Typically, silicone hydrogel contact lenses are produced according to a cast molding technique involving use of disposable or reusable molds and a silicone hydrogel lens formulation (i.e., a mixture of vinylic monomers and/or vinylic macromers). A silicone hydrogel lens formulation often comprises a bulky siloxane-containing vinylic monomer, such as, for example, a vinylic monomer having a tris(trialkylsilyloxy)silylalkyl group (e.g., tris(trimethylsilyloxy)-silylpropyl acrylate, tris(trimethylsilyloxy)-silylpropyl methacrylate, tris(trimethylsilyloxy)-silylpropyl acrylamide, tris(trimethylsilyloxy)-silylpropyl methacrylamide, tris-(trimethylsiloxysilyl) propylvinyl carbamate, etc.). It is reported that such a bulky siloxane-containing vinylic monomer is critical to the elimination of optical defects derived from handling during manufacturing, especially when curing the monomer mixture in a mold within a relatively short time (e.g., less than about 300 seconds) with a UV light. When such a bulky siloxane-containing vinylic monomer is eliminated from a monomer mixture for making silicone hydrogel contact lenses, resultant lenses may develop permanent deformations (optics defects) due to handling, whereas when such a bulky siloxane-containing vinylic monomer is present, resultant lenses exhibit a 'healing' effect that eliminated the optical defects (i.e., the folding marks become transient and can disappear after a short time period, e.g., about 15 minutes or less). However, silicone hydrogel lenses produced from a lens formulation known in the art may not have a desired thermal stability.

Therefore, there is still a need for silicone hydrogel contact lenses which have a relatively long thermal stability and can be produced by curing a lens formulation in molds within a relative short period of time (e.g., less than about 100 seconds).

SUMMARY OF THE INVENTION

In one aspect, the invention provides a soft contact lens, comprising a silicone hydrogel material which includes: (1) first repeating units derived from a hydrophilic (meth)acrylamide-type monomer; (2) second repeating units derived from a siloxane vinylic monomer having one sole N—$C_1$-$C_6$ alkyl (meth)acrylamido group and a siloxane-containing group which is a bis($C_1$-$C_6$ alkyldimethylsilyloxy)-$C_1$-$C_6$ alkylsilyl-$C_1$-$C_6$ alkyl group or a linear oligodimethylsiloxane chain having 3 to 10 (preferably 3 to 8, more preferably 3 to 5) dimethylsiloxane units and one $C_1$-$C_6$ alkyl terminal group; (3) third repeating units derived from a linear polysiloxane crosslinker which has two terminal (meth)acrylamido or methacryloxy groups and is free of any ester bond without a tertiary carbon atom adjacent to the carbonyl group of the ester bond, any urethane bond or any urea bond in the backbone of the polysiloxane crosslinker between the two terminal (meth)acrylamido or methacryloxy groups, wherein the soft contact lens has a relatively-long thermal stability as characterized by having an autoclave-induced change in elastic modulus, $$\left| \frac{\overline{EM_{19AC}} - \overline{EM_{1AC}}}{\overline{EM_{1AC}}} \right|,$$

of about 10% or less (preferably about 7.5% or less, more preferably about 5% or less), wherein $\overline{EM_{1AC}}$ is the averaged after-one-autoclave elastic modulus of the soft contact lens and is obtained by averaging the elastic modulus of 15 soft contact lenses measured after being autoclaved one sole time for 30 minutes at 121° C. in a phosphate buffered saline at a pH of 7.20±0.05 and $\overline{EM_{19AC}}$ is the averaged after-19-autoclaves elastic modulus of the soft contact lens and is obtained by averaging the elastic modulus of 15 soft contact lenses measured after being stored and autoclaved 19 times each for 30 minutes at 121° C. in a phosphate buffered saline at a pH of 7.20±0.05.

The present invention, in another aspect, provides a method for producing a silicone hydrogel contact lens having a relatively-long thermal stability. The method comprises the steps of: providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; introduce a lens formulation into the cavity, wherein the lens formulation comprises (1) a hydrophilic (meth)acrylamide-type monomer, (2) a siloxane vinylic monomer having one sole N—$C_1$-$C_6$ alkyl (meth)acrylamido group and a siloxane-containing group which is a bis($C_1$-$C_6$ alkyldimethylsilyloxy)-$C_1$-$C_6$ alkylsilyl-$C_1$-$C_6$ alkyl group or a linear oligodimethylsiloxane chain having 3 to 10 (preferably 3 to 8, more preferably 3 to 5) dimethylsiloxane units and one $C_1$-$C_6$ alkyl terminal group, (3) a linear polysiloxane crosslinker which has two terminal (meth)acryloyl groups and is free of any ester bond without a tertiary carbon atom adjacent to the carbonyl group of the ester bond, any urethane bond or any urea bond in the backbone of the polysiloxane crosslinker between the two terminal (meth)acryloyl groups, and (4) from about 0.05% to about 1.5% by weight of a photoinitator, and irradiating (preferably under a spatial limitation of actinic radiation) the lens formulation in the mold for a time period of about 100 seconds or less (preferably about 75 seconds or less, more preferably about 50 seconds or less, even more preferably about 30 seconds or less), so as to crosslink the lens formulation to form the silicone hydrogel contact lens, wherein the relatively-long thermal stability of the produced contact lens is characterized by having an autoclave-induced change in elastic modulus, $$\left| \frac{\overline{EM_{19AC}} - \overline{EM_{1AC}}}{\overline{EM_{1AC}}} \right|,$$

of about 10% or less (preferably about 7.5% or less, more preferably about 5% or less), wherein $\overline{EM_{1AC}}$ is the averaged after-one-autoclave elastic modulus of the soft contact lens and is obtained by averaging the elastic modulus of 15 soft contact lenses measured after being autoclaved one sole time for 30 minutes at 121° C. in a phosphate buffered saline at a pH of 7.20±0.05 and $\overline{EM_{19AC}}$ is the averaged after-19-autoclaves elastic modulus of the soft contact lens and is obtained by averaging the elastic modulus of 15 soft contact lenses measured after being stored and autoclaved 19 times each for 30 minutes at 121° C. in a phosphate buffered saline at a pH of 7.20±0.05. A produced soft contact lens has an oxygen permeability (Dk) of at least about 40 barrers (preferably at least about 50 barrers, more preferably at least about 60 barrers, and even more preferably at least about 70 barrers), a water content of from about 20% to about 75% (preferably from about 25% to about 70%, more preferably from about 30% to about 65%) by weight when fully hydrated, and an elastic modulus of from about 0.2 MPa to about 1.8 MPa, preferably from about 0.3 MPa to about 1.4 MPa, more preferably from about 0.4 MPa to about 1.0 MPa).

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein means that a number referred to as "about" comprises the recited number plus or minus 1-10% of that recited number.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" or "hydrogel material" refers to a crosslinked polymeric material which is insoluble in water, but can absorb at least 10 percent by weight of water when it is fully hydrated.

A "silicone hydrogel" or "silicone hydrogel material" refers to a silicone-containing crosslinked polymeric material which is insoluble in water, but can absorb at least 10 percent by weight of water when it is fully hydrated.

"Hydrophilic," as used herein, describes a material or portion thereof that will more readily associate with water than with lipids.

A "vinylic monomer" refers to a compound that has one sole ethylenically unsaturated group and is soluble in a solvent.

The term "soluble", in reference to a compound or material in a solvent, means that the compound or material can be dissolved in the solvent to give a solution with a concentration of at least about 0.5% by weight at room temperature (i.e., a temperature of about 20° C. to about 30° C.).

The term "insoluble", in reference to a compound or material in a solvent, means that the compound or material can be dissolved in the solvent to give a solution with a concentration of less than 0.005% by weight at room temperature (as defined above).

As used in this application, the term "ethylenically unsaturated group" is employed herein in a broad sense and is intended to encompass any groups containing at least one >C=C< group. Exemplary ethylenically unsaturated groups include without limitation (meth)acryloyl

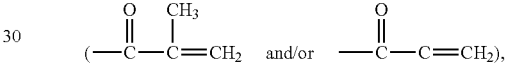

allyl, vinyl, styrenyl, or other C=C containing groups.

The term "ene group" refers to a monovalent radical comprising $CH_2$=CH— that is not covalently attached to an oxygen or nitrogen atom or a carbonyl group.

The term "(meth)acrylamido" refers to an ethylenically-unsaturated group of

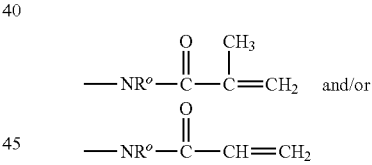

in which $R^o$ is hydrogen; the term "N—$C_1$-$C_6$ alkyl (meth)acrylamido" refers to an ethylenically-unsaturated group of

in which $R^o$ is $C_1$-$C_6$-alkyl.

As used in this application, "methacryloxy" refers to a monovalent radical of

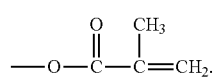

As used in this application, the term "(meth)acrylamide-type monomer" refers to a vinylic monomer containing one sole (meth)acrylamido group.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

As used in this application, the term "hydrophilic vinylic monomer" refers to a vinylic monomer capable of forming a homopolymer that is water-soluble or can absorb at least 10 percent by weight water at room temperature.

As used in this application, the term "hydrophobic vinylic monomer" refers to a vinylic monomer which as a homopolymer typically yields a polymer that is insoluble in water and can absorb less than 10 percent by weight water at room temperature.

A "macromer" or "prepolymer" refers to a compound or polymer that contains two or more ethylenically unsaturated groups and has an average molecular weight of greater than 700 Daltons.

A "polymer" means a material formed by polymerizing/crosslinking one or more vinylic monomers, macromers and/or prepolymers.

"Molecular weight" of a polymeric material (including monomeric or macromeric materials), as used herein, refers to the number-average molecular weight unless otherwise specifically noted or unless testing conditions indicate otherwise.

As used in this application, the term "crosslinker" refers to a compound or polymer having at least two ethylenically unsaturated groups and being soluble in a solvent at room temperature. A "crosslinking agent" refers to a crosslinker having a molecular weight of about 700 Daltons or less.

A "linear oligodimethylsiloxane chain" refers to a monovalent radical of

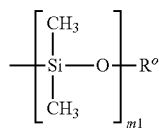

in which $R^o$ is $C_1$-$C_6$-alkyl and m1 is an integer of from 3 to 10, preferably from 3 to 8, more preferably from 3 to 5.

A "polysiloxane" refers to a compound containing a polysiloxane segment of

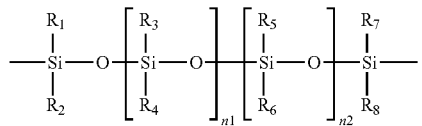

in which n1 and n2 independently of each other are an integer of from 0 to 500 and (n1+n2) is from 10 to 500, $R_1$, $R_2$, $R_3$, $R_4$, $R_5$, $R_6$, $R_7$, and $R_8$ independently of one another, are $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, or -alk-$(OC_2H_4)_{n3}$—$OR^o$ (in which alk is $C_1$-$C_6$-alkylene divalent radical, $R^o$ is H or $C_1$-$C_{10}$ alkyl and n3 is an integer from 1 to 10).

In this application, the term "backbone" in reference to a polysiloxane, polymer, polymer chain or compound means the principal chain of polysiloxane, polymer, polymer chain or compound, which consists of one sole chain of atoms connected by covalent bonds. It should be understood that all pendant groups and side chains are not considered to be parts of the backbone.

The term "fluid" means that a material is capable of flowing like a liquid.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. An alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

In this application, an "oxazoline" refers to a compound of

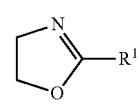

in which $R^1$ is hydrogen, methyl or ethyl group.

A "polyoxazoline segment" refers to a divalent radical of

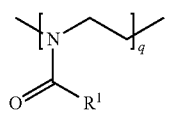

in which $R^1$ is hydrogen, methyl or ethyl group, and q is an integer from 3 to 500 and is obtained in a ring-opening polymerization.

The term "azetidinium" refers to a positively-charged, divalent radical (or group or moiety) of

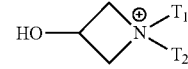

in which $T_1$ and $T_2$ are a direct bond.

The term "azlactone" refers to a mono-valent radical of

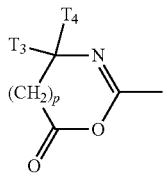

in which p is 0 or 1; $T_3$ and $T_4$ independently of each other is $C_1$-$C_8$ alkyl (preferably methyl).

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "spatial limitation of actinic radiation" refers to an act or process in which energy radiation in the form of rays is directed by, for example, a mask or screen or combinations thereof, to impinge, in a spatially restricted manner, onto an area having a well-defined peripheral boundary. A spatial limitation of UV/visible radiation is obtained by using a mask or screen having a radiation (e.g., UV/visible light) permeable region, a radiation (e.g., UV/visible light) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV/visible radiation) having a cross-sectional profile defined by the projection contour of the mask or screen. The projected beam of radiation (e.g., UV/visible radiation) limits radiation (e.g., UV/visible radiation) impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV/visible beam (i.e., a spatial limitation of radiation). The radiation used for the crosslinking is radiation energy, especially UV/visible radiation, gamma radiation, electron radiation or thermal radiation, the radiation energy preferably being in the form of a substantially parallel beam in order on the one hand to achieve good restriction and on the other hand efficient use of the energy.

The intrinsic "oxygen permeability", Dk, of a material is the rate at which oxygen will pass through a material. As used in this application, the term "oxygen permeability (Dk)" in reference to a hydrogel (silicone or non-silicone) or a contact lens means an oxygen permeability (Dk) which is measured at and corrected for the surface resistance to oxygen flux caused by the boundary layer effect according to the procedures shown in Examples hereinafter. Oxygen permeability is conventionally expressed in units of barrers, where "barrer" is defined as $[(cm^3 \text{ oxygen})(mm)/(cm^2)(sec)(mm \text{ Hg})] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm \text{ Hg})] \times 10^{-9}$.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

The term "thermal stability" in reference to a silicone hydrogel contact lens means that the silicone hydrogel contact lens can be subjected to 19 autoclaves (each for 30 minutes at 121° C.) in a phosphate-buffered saline (7.20±0.05) without significant autoclave-induced change in elastic modulus (i.e., an increase or decrease in elastic modulus of about 10% or less, preferably about 5% or less, relative to the elastic modulus of the silicone hydrogel contact lens which is subjected to one sole autoclave for 30 minutes at 121° C.) in a phosphate-buffered saline (7.20±0.05). The autoclave-induced change in elastic modulus ($\Delta \overline{EM_{AC}}$) is calculated based on the following equation $$\Delta \overline{EM_{AC}} = \left| \frac{\overline{EM_{19AC}} - \overline{EM_{1AC}}}{\overline{EM_{1AC}}} \right|,$$

in which $\overline{EM_{1AC}}$ is the averaged after-one-autoclave elastic modulus of the soft contact lens and is obtained by averaging the elastic modulus of 15 soft contact lenses measured after being autoclaved one sole time for 30 minutes at 121° C. in a phosphate buffered saline at a pH of 7.20±0.05 and $\overline{EM_{19AC}}$ is the averaged after-19-autoclaves elastic modulus of the soft contact lens and is obtained by averaging the elastic modulus of 15 soft contact lenses measured after being stored and autoclaved 19 times each for 30 minutes at 121° C. in a phosphate buffered saline at a pH of 7.20±0.05. It is believed that the tests of autoclave-induced change in elastic modulus of silicone hydrogel contact lenses can be used in replacing traditional accelerated shelf-life studies at elevated temperature (e.g., 65° C. to 95° C.), in order to shorten significantly the time required for determining the equivalent shelf-life at room temperature.

In general, the invention is directed to silicone hydrogel ophthalmic lens (in particular contact lenses) having a relatively long thermal stability. The invention is partly based on the unexpected discovery that when replacing a (meth)acrylamide-type vinylic monomer having a tris(trimethylsilyloxy) silylalkyl (TRIS) group with another vinylic monomer having one sole N—$C_1$-$C_6$ alkyl (meth)acrylamido group and a siloxane-containing group which is a bis($C_1$-$C_6$ alkyldimethylsilyloxy)-$C_1$-$C_6$ alkylsilyl-$C_1$-$C_6$ alkyl group in a monomer mixture (a lens formulation or lens-forming material) for making silicone hydrogel contact lenses, the thermal stability of resultant silicone hydrogel contact lenses can be improved significantly. The invention is also partly based on the finding that the thermal stability of a silicone hydrogel contact lens can be improved by using a polysiloxane crosslinker free of thermally unstable bonds (e.g., ester bonds without a tertiary carbon atom adjacent to the carbonyl group of the ester bond, urethane bonds, and/or urea bonds in the backbone of the polysiloxane crosslinker between the two terminal ethylenically-unsaturated groups, especially in combination with a siloxane vinylic monomer having one sole N—$C_1$-$C_6$ alkyl (meth)acrylamido group and a siloxane-containing group which is a bis($C_1$-$C_6$ alkyldimethylsilyloxy)-$C_1$-$C_6$ alkylsilyl-$C_1$-$C_6$ alkyl group.

There are several potential unique features associated with use of such a siloxane vinylic monomer in making silicone hydrogel contact lenses. First, by using such a siloxane vinylic monomer in a silicone hydrogel lens formulation, resultant silicone hydrogel contact lenses, even if they are obtained by curing a lens formulation in a mold within a relatively short time (e.g., less than about 50 seconds), can have improved thermal stability while eliminating optical defects derived from handling during manufacturing. Second, it is more suitable for a UV/visible-polymerization process requiring a short curing time (e.g., within a time period of about 50 seconds or less), because of the presence of N-alkyl (meth)acrylamido groups. Third, such a siloxane vinylic monomer, in combination with a polysiloxane crosslinker which is free of any ester bond without a tertiary carbon atom adjacent to the carbonyl group of the ester bond, any urethane bond and/or any urea bond in the backbone of the polysiloxane crosslinker between the two terminal (meth)acrylamido or methacryloxy groups in a silicone hydrogel lens formulation, can improve the thermal stability of silicone hydrogel contact lenses produced from the silicone hydrogel lens formulation. Fourth, due to the presence of both hydrophilic and hydrophobic groups in its molecule, such a siloxane vinylic monomer is compatible with hydrophilic and hydrophobic polymerizable components in a lens formulation so as to produce optically clear silicone hydrogel contact lenses.

The present invention, in one aspect, provides a soft contact lens comprising a silicone hydrogel material comprising: (1) first repeating units derived from a hydrophilic (meth)acrylamide-type monomer (preferably derived from a (meth)acrylamide-type monomer selected from the group consisting of N,N-dimethyl (meth)acrylamide, N-(hydroxymethyl)acrylamide, N-hydroxyethyl acrylamide, N-hydroxypropyl acrylamide, N-[Tris(hydroxymethyl) methyl] acrylamide, acrylamide, methacrylamide, N-(2-aminoethyl)(meth)acrylamide, N-(3-aminopropyl)(meth) acrylamide, and a mixture thereof, more preferably derived from N,N-dimethylacrylamide); (2) second repeating units derived from a siloxane vinylic monomer of formula (I) or (II) (preferably of formula (I))

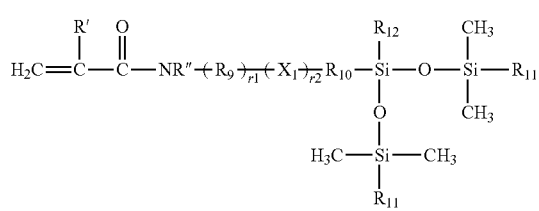

(I)

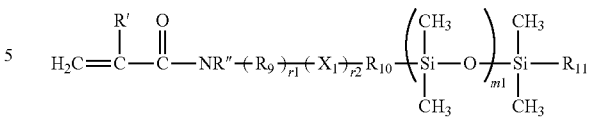

(II)

in which R' is hydrogen or methyl, R", $R_{11}$ and $R_{12}$ independent of one another are $C_1$-$C_6$ alkyl (preferably methyl), r1 and r2 independent of each other are integer of 0 or 1, m1 is an integer of 3 to 10 (preferably 3 to 8, more preferably 3 to 5), $R_9$ and $R_{10}$ independent of each other are a substituted or unsubstituted $C_1$-$C_{10}$ alkylene divalent group, $X_1$ is a linkage of

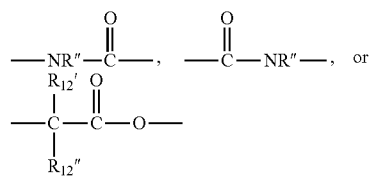

in which R" is as defined above and $R_{12}$" and $R_{12}$' independent of each other are $C_1$-$C_6$ alkyl (preferably methyl); and (3) third repeating units derived from a linear polysiloxane crosslinker which has two terminal (meth)acrylamido or methacryloxy groups and is free of any ester bond without a tertiary carbon atom adjacent to the carbonyl group of the ester bond, any urethane bond or any urea bond in the backbone of the polysiloxane crosslinker between the two terminal (meth)acrylamido or methacryloxy groups, wherein the soft contact lens has a relatively-long thermal stability as characterized by having an autoclave-induced change in elastic modulus, $$\left| \frac{\overline{EM_{19AC}} - \overline{EM_{1AC}}}{\overline{EM_{1AC}}} \right|,$$

of about 10% or less (preferably about 7.5% or less, more preferably about 5% or less), wherein $\overline{EM_{1AC}}$ is the averaged after-one-autoclave elastic modulus of the soft contact lens and is obtained by averaging the elastic modulus of 15 soft contact lenses measured after being autoclaved one sole time for 30 minutes at 121° C. in a phosphate buffered saline at a pH of 7.20±0.05 and $\overline{EM_{19AC}}$ is the averaged after-19-autoclaves elastic modulus of the soft contact lens and is obtained by averaging the elastic modulus of 15 soft contact lenses measured after being stored and autoclaved 19 times each for 30 minutes at 121° C. in a phosphate buffered saline at a pH of 7.20±0.05. A soft contact lens of the invention has an oxygen permeability (Dk) of at least about 40 barrers (preferably at least about 50 barrers, more preferably at least about 60 barrers, and even more preferably at least about 70 barrers), a water content of from about 20% to about 75% (preferably from about 25% to about 70%, more preferably from about 30% to about 65%) by weight when fully hydrated, and an elastic modulus of from about 0.2 MPa to about 1.8 MPa, preferably from about 0.3 MPa to about 1.4 MPa, more preferably from about 0.4 MPa to about 1.0 MPa).

A person skilled in the art knows well how to measure the oxygen permeability, and water content and elastic modulus of silicone hydrogel contact lenses. These lens properties have been reported by all manufacturers for their silicone hydrogel contact lens products.

In accordance with one preferred embodiment in this aspect of the invention, a hydrophilic (meth)acrylamide-type monomer can be N,N-dimethylacrylamide, N,N-dimethylmethacrylamide, N-(hydroxymethyl)acrylamide, N-hydroxyethyl acrylamide, N-hydroxypropyl acrylamide, N-[Tris(hydroxymethyl)methyl] acrylamide, acrylamide, methacrylamide, N-(2-aminoethyl)(meth)acrylamide, N-(3-aminopropyl)(meth)acrylamide, or a mixture thereof, preferably is N,N-dimethylacrylamide. It is understood that other (meth)acrylamide-type monomers can also be used in this invention.

In accordance with another preferred embodiment in this aspect of the invention, the second repeating units preferably are derived from a siloxane vinylic monomer of formula (I). More preferably, in formula (I) R' is hydrogen; r1 and r2 are zero; $R_{10}$ is a substituted or unsubstituted $C_1$-$C_{10}$ alkylene divalent group (preferably propylene divalent group); and/or $R_{11}$ and $R_{12}$ independent of each other are methyl. Examples of such preferred siloxane vinylic monomers include without limitation

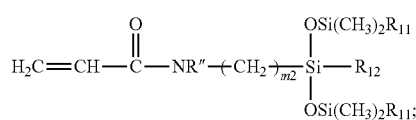
(Ia)

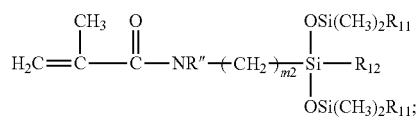
(Ib)

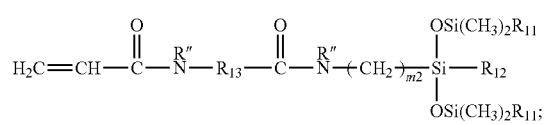
(Ic)

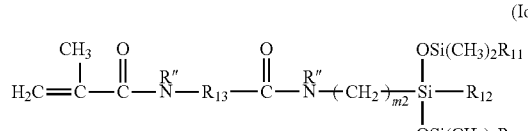
(Id)

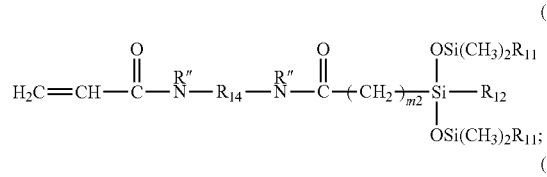
(Ie)

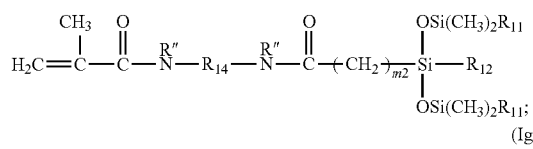
(If)

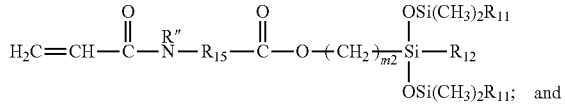
(Ig)

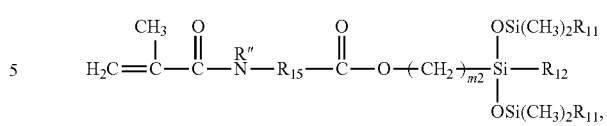
(Ih)

in which $R_{13}$ is an alkylene divalent group of —$CH_2CH_2$—, —$CH_2CH_2CH_2$—, —$CH_2CH_2CH_2CH_2$—,

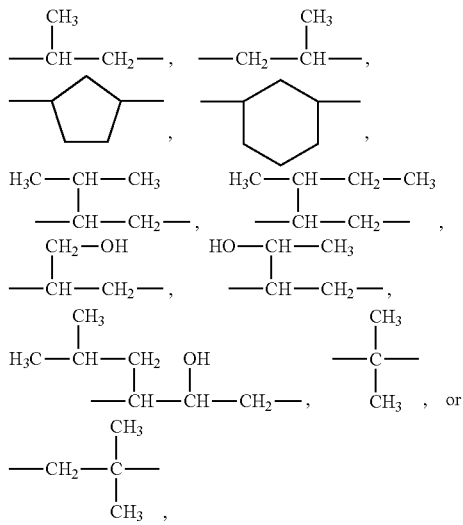

$R_{14}$ is a divalent alkylene radical of —$CH_2CH_2$— or —$CH_2CH_2CH_2$—, and $R_{15}$ is a divalent alkylene radical of

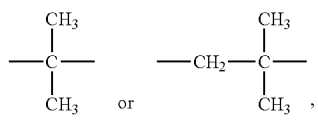

R", $R_{12}$ and $R_{11}$ independent of one another are $C_1$-$C_4$ alkyl (preferably methyl), and m2 is an integer of from 3 to 5.

A siloxane vinylic monomer of formula (I) can be prepared from a monofunctional trisiloxane of formula (IV)

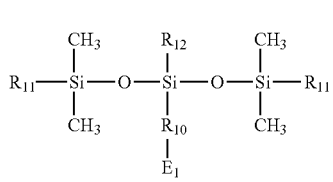
(IV)

In which $R_{12}$, $R_{10}$ and $R_{11}$ are as defined above and $E_1$ is amino (—$NH_2$), carboxyl (—COOH) or hydroxyl group (—OH), by reacting it with N-hydroxysuccinimide ester of (meth)acrylic acid, (meth)acrylic acid halide (chloride or bromide), (meth)acrylic acid anhydride, (meth)acrylic acid, a $NH_2$-containing (meth)acrylamide, a carboxyl-containing (meth)acrylamide, or an azlactone-containing vinylic monomer (e.g., 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4- methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one), in a coupling reaction, to obtain an N-substituted (meth)acrylamide; followed by reacting the resultant N-substituted (meth)acrylamide with a $C_1$-$C_6$ alkyl halide according to a process described in U.S. Pat. No. 4,835,312 (herein incorporated by reference in its entirety) to obtain an N,N-substituted (meth)acrylamide.

Non-limiting examples of coupling reactions under various reaction conditions between a pair of matching co-reactive functional groups selected from the group preferably consisting of amino group (—$NHR^o$ in which $R^o$ is H or $C_1$-$C_{10}$alkyl), hydroxyl group, carboxyl group, acid halide group (—COX, X=Cl, Br, or I), acid anhydrate group, aldehyde group, azlactone group, isocyanate group, epoxy group, aziridine group, and thiol group, are given below for illustrative purposes. An amino group reacts with aldehyde group to form a Schiff base which may further be reduced; an amino group —$NHR^o$ (in which $R^o$ is hydrogen or $C_1$-$C_6$ alkyl) reacts with an acid chloride or bromide group or with an acid anhydride group to form an amide linkage (—CO—$NR^o$—); an amino group —$NHR^o$ reacts with a N-hydroxysuccinimide ester group to form an amide linkage; an amino group —$NHR^o$ reacts with a carboxylic acid group in the presence of a coupling agent—carbodiimide (e.g., 1-ethyl-3-(3-dimethylaminopropyl) carbodiimide (EDC), N,N'-dicyclohexylcarbodiimide (DCC), 1-cyclohexyl-3-(2-morpholinoethyl)carbodiimide, diisopropyl carbodiimide, or mixtures thereof) and N-hydroxysuccinimide to form an amide linkage; an amino group —$NHR^o$ reacts (ring-opening) with an azlactone group to form an alkylenediamido linkage (—C(O)NH-alkylene-C(O)$NR^o$— with $R^o$ as defined above); an amino group —$NHR^o$ reacts with an isocyanate group to form a urea linkage (—$NR^o$—C(O)—NH— with $R^o$ as defined above); an amino group —$NHR^o$ reacts with an epoxy or aziridine group to form an amine bond (—C—$NR^o$— with $R^o$ as defined above); a hydroxyl reacts with an isocyanate to form a urethane linkage; a hydroxyl reacts with an epoxy or aziridine to form an ether linkage (—O—); a hydroxyl reacts with an acid chloride or bromide group or with an acid anhydride group to form an ester linkage; an hydroxyl group reacts with an azlactone group in the presence of a catalyst to form an amidoalkylenecarboxy linkage (—C(O)NH-alkylene-C(O)—O—); a carboxyl group reacts with an epoxy group to form an ester bond; a thiol group (—SH) reacts with an isocyanate to form a thiocarbamate linkage (—N—C(O)—S—); a thiol group reacts with an epoxy or aziridine to form a thioether linkage (—S—); a thiol group reacts with an acid chloride or bromide group or with an acid anhydride group to form a thioester linkage; a thiol group reacts with an azlactone group in the presence of a catalyst to form a linkage (—C(O)NH—$CR_{12}R_{12}'$—$(CH_2)_p$-C(O)—S—); a thiol group reacts with a vinyl group based on thiol-ene reaction under thiol-ene reaction conditions to form a thioether linkage (—S—); a thiol group reacts with an acryloyl or methacryloyl group based on Michael Addition under appropriate reaction conditions to form a thioether linkage; an azetidinium group

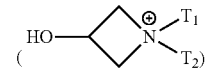

reacts with amino group (—$NHR^o$), a carboxyl, a hydroxyl, or thiol to form a linkage ($T_1T_2N$—CH2-CH(OH)—$CH_2$-E- with E=$NR^o$, COO, O, or S) at an temperature of from about 40° C. to 140° C.

The reactions conditions for the above described coupling reactions are taught in textbooks and are well known to a person skilled in the art.

A monofunctional trisiloxane of formula (IV) can be prepared from a hydrosiloxane-containing trisiloxane of formula (V)

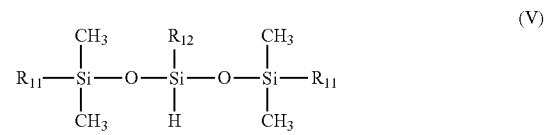

in which $R_{12}$ and $R_{11}$ are as defined above, by reacting it with an ene-containing monomer having an amino, carboxyl or hydroxyl group, in a platinum-catalyzed hydrosilylation reaction as known to a person skilled in the art.

Hydrosiloxane-containing trisiloxane of formula (V) can be prepared according to the procedures described in EP2136622B1 (herein incorporated by reference in its entirety).

Examples of an ene-containing monomer having an amino, carboxyl or hydroxyl group include without limitation vinyl-$C_1$-$C_{10}$ alkyl-carboxylic acid (i.e., $CH_2$=CH-(alk)$_t$-COOH in which t=1 to 10 and alk being a substituted or unsubstituted alkyl diradical, such as, for example, 3-butenoic acid, 4-pentenoic acid, 5-hexenoic acid, 6-heptenoic acid, 7-octenoic acid, 8-nonenoic acid, 9-decenoic acid); vinyl-$C_1$-$C_{12}$ alkylamines (allylamine, 3-butenylamine, 4-pentenylamine, 1-methyl-4-pentenylamine, 5-hexenylamine, 5-heptenylamine, 6-heptenylamine); N-allyl-$C_1$-$C_{12}$ alkylamines (e.g., N-ethyl-2-methylallylamine, N-ethylallylamine, N-allylmethylamine, N-allyl-1-pentanamine, N-allyl-2-methyl-1-pentanamine, N-Allyl-2,3-dimethyl-1-pentanamine, N-allyl-1-hexanamine, N-allyl-2-methyl-1-hexanamine, N-allyl-1-heptanamine, N-allyl-1-octanamine, N-allyl-1-ecanamine, N-allyl-1-dodecanamine); allyl-$C_1$-$C_{10}$ alkyl alcohols (e.g., allyl alcohol, allylcarbinol, allyethyl alcohol, 5-hexen-1-ol, 5-hexen-2-ol, 9-decen-1-ol); vinyl-$C_1$-$C_{10}$ alkyl halides (e.g., ally bromide, 4-bromo-1-butene, 5-bromo-1-pentene, 6-bromo-1-hexene, 7-bromo-1-heptene, 8-bromo-1-octene, 9-bromo-nonene, 10-bromo-1-decene); vinyl-$C_1$-$C_{10}$ alkyl epoxides (e.g., 3,4-epoxy-1-butene, 3,4-epoxy-1-pentene, 4,5-epoxy-1-pentene, 2-methyl-2-vinyloxirane, 1,2-epoxy-5-hexene, 1,2-epoxy-6-heptene, 1,2-epoxy-7-octene, 1,2-epoxy-8-nonene, 1,2-epoxy-9-decene); and azetidinium-containing ene-containing monomers (e.g., a reaction product of a N-allyl-$C_1$-$C_{12}$ alkylamine with epichlorohydrin).

A siloxane vinylic monomer of formula (Ia) or (Ib) can be prepared by first reacting a monofunctional trisiloxane of formula (IV) (in which $E_1$ is $NH_2$) with (meth)acrylic acid chloride (or bromide), (meth)acrylic acid anhydride, the N-hydroxysuccinimide ester of (meth)acrylic acid, or (meth) acrylic acid in the presence of EDC and N-hydroxysuccinimide to obtain an N-substituted (meth)acrylamide, and then by reacting the resultant N-substituted (meth)acrylamide with alkyl halide (as described above).

A siloxane vinylic monomer of formula (Ic) or (Id) can be prepared by first reacting a monofunctional trisiloxane of formula (IV) (in which $E_1$ is $NH_2$) with carboxyl-containing (meth)acrylamide (e.g., a reaction product of N-hydroxysuccinimide ester of (meth)acrylic acid with an amino acid selected from the group consisting of β-alanine, γ-aminobutyric acid, 5-aminovaleric acid, 3-aminobutanoic acid, 3-aminoisobutyric acid, 3-aminocyclohexane carboxylic acid, 3-aminocyclopentane carboxylic acid, β-leucine, β-isoleucine, β-serine, β-threonine, or statine) or an azlactone-containing vinylic monomer (e.g., 2-vinyl-4,4-dimethyl-1,3-oxazolin-5-one, 2-isopropenyl-4,4-dimethyl-1,3-oxazolin-5-one, 2-vinyl-4,4-dimethyl-1,3-oxazolin-6-one, or 2-isopropenyl-4,4-dimethyl-1,3-oxazolin-6-one) to obtain an N-substituted (meth)acrylamide, and then by reacting the resultant N-substituted (meth)acrylamide with alkyl halide (as described above).

A siloxane vinylic monomer of formula (Ie) or (If) can be prepared by first reacting a monofunctional trisiloxane of formula (IV) (in which $E_1$ is carboxyl group) with $NH_2$-containing (meth)acrylamide (e.g., (meth)acrylamidoethylamine or (meth)acrylamidopropylamine) to obtain an N-substituted (meth)acrylamide, and then by reacting the resultant N-substituted (meth)acrylamide with alkyl halide (as described above).

A siloxane vinylic monomer of formula (Ig) or (Ih) can be prepared by reacting a monofunctional trisiloxane of formula (IV) (in which $E_1$ is hydroxyl group) with an azlactone-containing vinylic monomer (e.g., 2-vinyl-4,4-dimethyl-1,3-oxazolin-5-one, 2-isopropenyl-4,4-dimethyl-1,3-oxazolin-5-one, 2-vinyl-4,4-dimethyl-1,3-oxazolin-6-one, or 2-isopropenyl-4,4-dimethyl-1,3-oxazolin-6-one) to obtain an N-substituted (meth)acrylamide, and then by reacting the resultant N-substituted (meth)acrylamide with alkyl halide (as described above).

(—OH), by first reacting it with N-hydroxysuccinimide ester of (meth)acrylic acid, (meth)acrylic acid halide (chloride or bromide), (meth)acrylic acid anhydride, (meth)acrylic acid, a $NH_2$-containing (meth)acrylamide, a carboxyl-containing (meth)acrylamide, or an azlactone-containing vinylic monomer (e.g., 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one), in a coupling reaction well known to a person skilled in the art (as described above) to obtain N-substituted (meth)acrylamide, and then by reacting N-substituted (meth)acrylamide with alkyl halide (as described above).

A monofunctional oligo-dimethylsiloxane of formula (VI) can be prepared by initiating the "living" polymerization of hexamethylcyclotrisiloxane with alkyl lithium (e.g., n-butyl lithium) and quenching the reaction with dimethylchlorosilane followed by hydrosilylation with an ene-containing monomer (e.g., allylamine, 3-butenylamine, 4-pentenylamine, 5-hexenylamine, 5-heptenylamine, 6-heptenylamine, allyl alcohol, allylcarbinol, allyethyl alcohol, 5-hexen-1-ol, 5-hexen-2-ol, 9-decen-1-ol, 3-butenoic acid, 4-pentenoic acid, 5-hexenoic acid, 6-heptenoic acid, 7-octenoic acid, 8-nonenoic acid, 9-decenoic acid).

In accordance with another preferred embodiment in this aspect of the invention, the third repeating units preferably are derived from a polysiloxane crosslinker of formula (III)

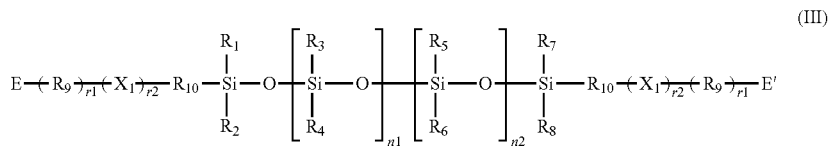

In accordance with another preferred embodiment in this aspect of the invention, the second repeating units preferably are derived from a siloxane vinylic monomer of formula (II). More preferably, in formula (II), R' is hydrogen; r1 and r2 are zero; $R_{10}$ a substituted or unsubstituted $C_1$-$C_{10}$ alkylene divalent radical; R" is $C_1$-$C_6$ alkyl (preferably methyl); $R_{11}$ is $C_1$-$C_6$ alkyl.

A siloxane vinylic monomer of formula (II) can be prepared from a monofunctional oligo-dimethylsiloxane of formula (VI)

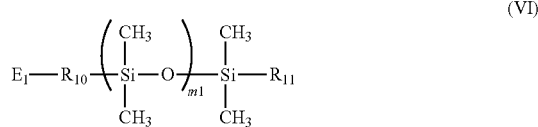

In which $R_{11}$, $R_{10}$, and m1 are as defined above and $E_1$ is amino (—$NH_2$), carboxyl (—COOH) or hydroxyl group in which E and E' independent of each other are methacryloxy, (meth)acrylamide, or N—$C_1$-$C_6$ alkyl (meth)acrylamido group, $R_9$, $R_{10}$, $X_1$, r1, r2 are as defined above, n1 and n2 independently of each other are an integer of from 0 to 200 and (n1+n2) is from 10 to 200, and $R_1$, $R_2$, $R_3$, $R_4$, $R_5$, $R_6$, $R_7$, and $R_8$ independently of one another, are $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, or -alk-$(OC_2H_4)_{n3}$—$OR^o$ (in which alk is $C_1$-$C_6$-alkylene divalent radical, $R^o$ is H or $C_1$-$C_6$ alkyl and n3 is an integer from 1 to 10). More preferably, $R_1$ to $R_8$ are methyl; or $R_1$ to $R_4$ and $R_6$ to $R_8$ are methyl whereas $R_5$ is -alk-$(OC_2H_4)_{n3}$—$OR^o$ in which alk is $C_1$-$C_6$-alkylene divalent radical, $R^o$ is H or $C_1$-$C_{10}$ alkyl and n3 is an integer from 1 to 10.

In accordance with another preferred embodiment in this aspect of the invention, a soft contact lens of the invention comprises a silicone hydrogel material that further comprises, in its polymer matrix, fourth repeating units derived from a cross-linking agent selected from the group consisting of N,N'-methylene-bis-(meth)acrylamide, N,N'-ethylene-bis-(meth)acrylamide, N,N'-dihydroxyethylene-bis-(meth)acrylamide, 1,3-bis(acrylamidopropyl)-1,1,3,3-tetramethyldisiloxane, 1,3-bis(methacrylamidopropyl)-1,1,3,3-tetramethyldisiloxane, and combinations thereof. Crosslinking agents may be used to improve structural integrity and mechanical strength.

In accordance with another preferred embodiment in this aspect of the invention, a soft contact lens of the invention comprises a silicone hydrogel material that further comprises, in its polymer matrix, fifth repeating units derived from a vinylic monomer capable of absorbing ultra-violet radiation (UV) and high energy violet light (HEVL) is used in the invention. By having a UV-absorbing or UV/HEVL-absorbing vinylic monomeric units, silicone hydrogel lenses with UV-absorbing or UV/HEVL-absorbing capability can be obtained. Such lenses may protect to some extent corneal from damages caused by ultra-violet ("UV") radiation and optionally high energy violet light.

Examples of preferred UV-absorbing and UV/HEVL-absorbing, benzotriazole-containing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-(2'-hydroxy-5'-methacryloxyethylphenyl) benzotriazole (2-Propenoic acid, 2-methyl-, 2-[3-(2H-benzotriazol-2-yl)-4-hydroxyphenyl] ethyl ester, Norbloc), 2-{2'-Hydroxy-3'-tert-butyl-5'-[3'-methacryloyloxypropoxy]phenyl}-5-methoxy-2H-benzotriazole (UV13), 2-[2'-Hydroxy-3'-tert-butyl-5'-(3'-acryloyloxypropoxy)phenyl]-5-trifluoromethyl-2H-benzotriazole (CF₃-UV13), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxyphenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS#96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS#1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9Cl) (CAS#83063-87-0). In accordance with the invention, the polymerizable composition comprises about 0.2% to about 5.0%, preferably about 0.3% to about 2.5%, more preferably about 0.5% to about 1.8%, by weight of a UV-absorbing agent.

Where a vinylic monomer capable of absorbing ultra-violet radiation and high energy violet light (HEVL) is used in the invention, a Germane-based Norrish Type I photoinitiator and a light source including a light in the region of about 400 to about 550 nm are preferably used to initiate a free-radical polymerization. Any Germane-based Norrish Type I photoinitiators can be used in this invention, so long as they are capable of initiating a free-radical polymerization under irradiation with a light source including a light in the region of about 400 to about 550 nm. Examples of Germane-based Norrish Type I photoinitiators are acylgermanium compounds described in U.S. Pat. No. 7,605,190 (herein incorporated by reference in its entirety). Preferably, the monomer of lens-forming materials comprises at least one of the following acylgermanium compounds.

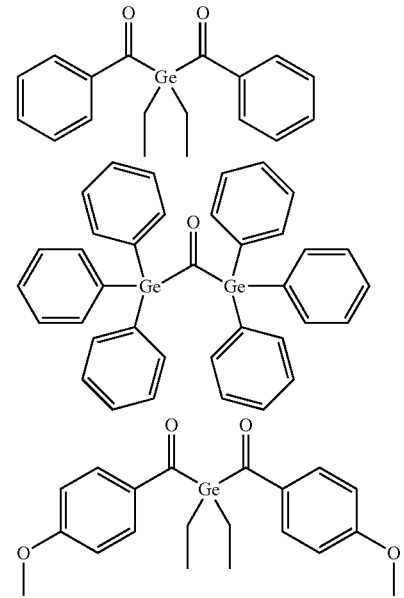

Where the lens formulation comprises a UV-absorbing vinylic monomer, a benzoylphosphine oxide photoinitiator is preferably used as the photoinitiator in the invention. Preferred benzoylphosphine oxide photoinitiators include without limitation 2,4,6-trimethylbenzoyldiphenylphosphine oxide; bis-(2,6-dichlorobenzoyl)-4-N-propylphenylphosphine oxide; and bis-(2,6-dichlorobenzoyl)-4-N-butylphenylphosphine oxide. It is understood that any photoinitiators other than benzoylphosphine oxide initiators can be used in the invention.

It is understood that a soft contact lens of the invention can optionally comprise minor amount of additional repeating units (i.e., less than about 5% by weight of total polymerizable components in a lens formulation for making the soft contact lens) derived from a hydrophilic vinylic monomer other than (meth)acrylamide-type vinylic monomer and/or a non-silicone hydrophobic vinylic monomer.

Nearly any hydrophilic vinylic monomer can be used in the invention. Suitable hydrophilic vinylic monomers are, without this being an exhaustive list, hydroxyl-substituted lower alkyl ($C_1$ to $C_6$) acrylates and methacrylates, hydroxyl-substituted lower alkyl vinyl ethers, N-vinylpyrrole, N-vinyl-2-pyrrolidone, 2-vinyloxazoline, 2-vinyl-4,4'-dialkyloxazolin-5-one, 2- and 4-vinylpyridine, olefinically unsaturated carboxylic acids having a total of 3 to 6 carbon atoms, amino(lower alkyl)—(where the term "amino" also includes quaternary ammonium), mono(lower alkylamino) (lower alkyl) and di(lower alkylamino)(lower alkyl)acrylates and methacrylates, allyl alcohol, N-vinyl alkylamide, N-vinyl-N-alkylamide, and the like. Among the preferred hydrophilic vinylic monomers are 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, Aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, acrylic acid, a $C_1$-$C_4$-alkoxy polyethylene glycol (meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, and N-vinyl caprolactam. More preferably, the hydrophilic vinylic monomer other than amide-type vinylic monomer is an acrylate monomer.

Nearly any hydrophobic vinylic monomer can be used in the actinically polymerizable composition for preparing the intermediary copolymer with pendant or terminal functional groups. Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethyl methacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate.

In accordance with another preferred embodiment in this aspect of the invention, a soft contact lens comprises a silicone hydrogel material which is a polymerization product of a lens formulation comprising: (1) from about 5% to about 60% by weight, preferably from about 10% to about 50% by weight, even more preferably from about 15% to about 45% by weight, even more preferably from about 20% to about 40% by weight, of a hydrophilic (meth)acrylamide-type monomer; (2) from about 5% to about 50% by weight, preferably from about 10% to about 40% by weight, more preferably from about 15% to about 30% by weight, of a siloxane vinylic monomer of formula (I) and/or (II); (3) from about 5% to about 50%, preferably from about 10% to about 40% by weight, more preferably from about 15% to about 35% by weight, of an α,ω-di(meth)acrylamido-terminated polysiloxane of formula (III); (4) from about 0.05% to about 1.5% by weight, preferably from about 0.1% to 1.3% by weight, more preferably from about 0.5% to about 1.1% by weight, of a photoinitiator; (5) from 0 to 4% by weight, preferably from about 0 to about 3% by weight, more preferably from about 0.05% to about 2.5%, even more preferably from about 0.1% to about 2%, of a crosslinking agent selected from the group consisting of N,N'-methylene-bis-(meth)acrylamide, N,N'-ethylene-bis-(meth)acrylamide, N,N'-dihydroxyethylene-bis-(meth)acrylamide, 1,3-bis (acrylamidopropyl)-1,1,3,3-tetramethyldisiloxane, 1,3-bis (methacrylamidopropyl)-1,1,3,3-tetramethyldisiloxane, and combinations thereof; and (6) from 0 to 5% by weight, preferably from about 0.2% to 5% by weight, more preferably from about 0.5% to about 2.5% by weight, of a polymerizable UV-absorbing or UV/HEVL-absorbing vinylic monomer. The foregoing range combinations are presented with the proviso that the listed components and any additional components add up to 100% by weight.

In addition to above-described Germane-based Norrish Type I photoinitiators and benzoylphosphine oxide photoinitiators, other suitable photoinitiators, such as, e.g., benzoin methyl ether, diethoxyacetophenone, a benzoylphosphine oxide, 1-hydroxycyclohexyl phenyl ketone and Darocur and Irgacure types, preferably Darocur 1173®, Irgacure 369®, Irgacure 379®, and Irgacure 2959®, can also be used in the invention, especially if a lens formulation is free of any UV-absorbing or UV/HEVL-absorbing vinylic monomers. The polymerization can then be triggered off by actinic radiation, for example light, in particular UV/visible light of a suitable wavelength. The spectral requirements can be controlled accordingly, if appropriate, by addition of suitable photosensitizers.

A lens formulation for making a silicone hydrogel contact lens of the invention can further comprise an antimicrobial agent, preferably antimicrobial metal nanoparticles, more preferably silver nanoparticles.

In accordance with the present invention, a soft contact lens of the invention can further comprise various components, such as, visibility tinting agents (e.g., dyes, pigments, or mixtures thereof), antimicrobial agent (e.g., silver nanoparticles), a bioactive agent, leachable lubricants, leachable tear-stabilizing agents, and the like, as known to a person skilled in the art.

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crosslinkable hydrophilic polymers (i.e., without ethylenically unsaturated groups). Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof. The weight-average molecular weight $M_w$ of the non-crosslinkable hydrophilic polymer is preferably from 5,000 to 500,000, more preferably from 10,000 to 300,000, even more preferably from 20,000 to 100,000.

Examples of leachable tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, a tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

A person skilled in the art knows very well how to make contact lenses. For example, contact lenses can be produced in a conventional "spin-casting mold," or by the full cast-molding process in a static form, or by lathe cutting of silicone hydrogel buttons as used in making customized contact lenses. In cast-molding, a lens formulation typically is dispensed into molds and cured (i.e., polymerized and/or crosslinked) in molds for making contact lenses.

In accordance with the invention, a lens formulation (or lens-forming material) is a fluid composition, which can be a solution or a melt at a temperature from about 20° C. to about 85° C. A lens formulation can be prepared by dissolving all of the desirable components in any suitable solvent known to a person skilled in the art. Example of suitable solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methylpyrrolidinone, and mixtures thereof. Preferably, a lens formulation is a solution of all the desirable components in water, 1,2-propylene glycol, a polyethyleneglycol having a molecular weight of about 400 Daltons or less, or a mixture thereof.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, the lens formulation (or composition) can be introduced (dispensed) into a cavity formed by a mold according to any known methods.

After the lens formulation is dispensed into the mold, it is polymerized to produce a contact lens. Crosslinking may be initiated thermally or actinically, preferably by exposing the lens formulation in the mold to a spatial limitation of actinic radiation to crosslink the polymerizable components in the lens formulation.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described above. Preferably, water or an aqueous solution is used as extraction solvent. After extraction, lenses can be hydrated in water or an aqueous solution of a wetting agent (e.g., a hydrophilic polymer).

The molded contact lenses can further subject to further processes, such as, for example, surface treatment, packaging in lens packages with a packaging solution which can contain about 0.005% to about 5% by weight of a wetting agent (e.g., a hydrophilic polymer described above or the like known to a person skilled in the art) and/or a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization such as autoclave at from 118 to 124° C. for at least about 30 minutes; and the like.

It should be understood that although in this aspect of the invention various embodiments including preferred, more preferred, even more preferred, and most preferred embodiments of the invention may be described above separately, they can be combined and/or used together in any desirable fashion to arrive at different embodiments of a soft contact lenses of the invention.

The present invention, in another aspect, provides a method for producing a silicone hydrogel contact lens having a relatively-long thermal stability. The method comprises the steps of: providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; introduce a lens formulation into the cavity, wherein the lens formulation comprises (1) a hydrophilic (meth)acrylamide-type monomer, (2) a siloxane vinylic monomer of formula (I) or (II) (preferably of formula (I))

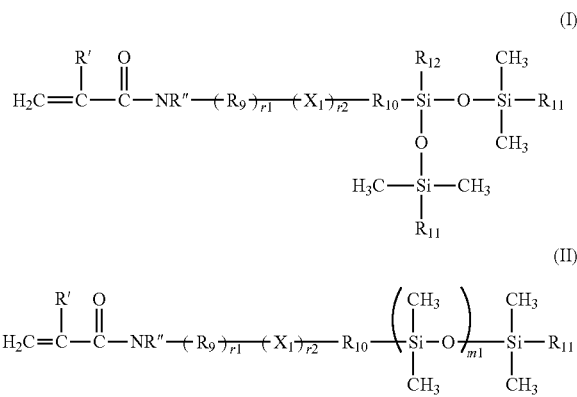

in which R' is hydrogen or methyl, R", $R_{11}$ and $R_{12}$ independent of one another are $C_1$-$C_6$ alkyl (preferably methyl), r1 and r2 independent of each other are integer of 0 or 1, m1 is an integer of 3 to 10 (preferably 3 to 8, more preferably 3 to 5), $R_9$ and $R_{10}$ independent of each other are a substituted or unsubstituted $C_1$-$C_{10}$ alkylene divalent group, $X_1$ is a linkage of

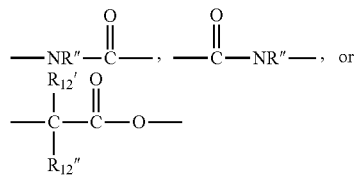

in which R" is as defined above and $R_{12}$" and $R_{12}$' independent of each other are $C_1$-$C_6$ alkyl (preferably methyl), (3) a linear polysiloxane crosslinker which has two terminal (meth)acrylamido or methacryloxy groups and is free of any ester bond without a tertiary carbon atom adjacent to the carbonyl group of the ester bond, any urethane bond or any urea bond in the backbone of the polysiloxane crosslinker between the two terminal (meth)acrylamido or methacryloxy groups, and (4) from about 0.05% to about 1.5% by weight of a photoinitiator, and irradiating (preferably under a spatial limitation of actinic radiation) the lens formulation in the mold for a time period of about 100 seconds or less (preferably about 75 seconds or less, more preferably about 50 seconds or less, even more preferably about 30 seconds or less), so as to crosslink the lens formulation to form the silicone hydrogel contact lens, wherein the relatively-long thermal stability of the produced contact lens is characterized by having an autoclave-induced change in elastic modulus, $$\left| \frac{\overline{EM_{19AC}} - \overline{EM_{1AC}}}{\overline{EM_{1AC}}} \right|,$$

of about 10% or less (preferably about 7.5% or less, more preferably about 5% or less), wherein $\overline{EM_{1AC}}$ is the averaged after-one-autoclave elastic modulus of the soft contact lens and is obtained by averaging the elastic modulus of 15 soft contact lenses measured after being autoclaved one sole time for 30 minutes at 121° C. in a phosphate buffered saline at a pH of 7.20±0.05 and $\overline{EM_{19AC}}$ is the averaged after-19-autoclaves elastic modulus of the soft contact lens and is obtained by averaging the elastic modulus of 15 soft contact lenses measured after being stored and autoclaved 19 times each for 30 minutes at 121° C. in a phosphate buffered saline at a pH of 7.20±0.05. A produced soft contact lens has an oxygen permeability (Dk) of at least about 40 barrers (preferably at least about 50 barrers, more preferably at least about 60 barrers, and even more preferably at least about 70 barrers), a water content of from about 20% to about 75% (preferably from about 25% to about 70%, more preferably from about 30% to about 65%) by weight when fully hydrated, and an elastic modulus of from about 0.2 MPa to about 1.8 MPa, preferably from about 0.3 MPa to about 1.4 MPa, more preferably from about 0.4 MPa to about 1.0 MPa).

Various embodiments of hydrophilic (meth)acrylamide-type monomers, siloxane vinylic monomers of formula (I) or (II), linear polysiloxanes crosslinkers, crosslinking agents, polymerizable UV-absorbing or UV/HEVL-absorbing vinylic monomers, photoinitiators, solvents, lens formulations, hydrophilic vinylic monomers, thermal initiators, visibility tinting agents, antimicrobial agents, bioactive agents, leachable lubricants, leachable tear-stabilizing agents, molds, polymerizing techniques, and post molding processes are described above and can be used in this aspect of the invention.

In a preferred embodiment, the resultant silicone hydrogel contact lens is extracted with water or an aqueous solution.

In another preferred embodiment, the mold is a reusable mold and the lens-forming composition is cured (i.e., polymerized) actinically under a spatial limitation of actinic radiation to form a silicone hydrogel contact lens. Examples of preferred reusable molds are those disclosed in U.S. Pat. Nos. 6,627,124, 6,800,225, 7,384,590, and 7,387,759, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, and combinations thereof.

In another preferred embodiment, the lens formulation comprises: (1) from about 5% to about 60% by weight, preferably from about 10% to about 50% by weight, even more preferably from about 15% to about 45% by weight, even more preferably from about 20% to about 40% by weight, of a hydrophilic (meth)acrylamide-type monomer; (2) from about 5% to about 50% by weight, preferably from about 10% to about 40% by weight, more preferably from about 15% to about 30% by weight, of a siloxane vinylic monomer of formula (I) and/or (II); (3) from about 5% to about 50%, preferably from about 10% to about 40% by weight, more preferably from about 15% to about 35% by weight, of a polysiloxane crosslinker of formula (III) (as defined above); (4) from about 0.05% to about 1.5% by weight, preferably from about 0.1% to 1.3% by weight, more preferably from about 0.5% to about 1.1% by weight, of a photoinitiator; (5) from 0 to 4% by weight, preferably from about 0 to about 3% by weight, more preferably from about 0.05% to about 2.5%, even more preferably from about 0.1% to about 2%, of a crosslinking agent selected from the group consisting of N,N'-methylene-bis-(meth)acrylamide, N,N'-ethylene-bis-(meth)acrylamide, N,N'-dihydroxyethylene-bis-(meth)acrylamide, 1,3-bis(acrylamidopropyl)-1,1,3,3-tetramethyldisiloxane, 1,3-bis (methacrylamidopropyl)-1,1,3,3-tetramethyldisiloxane, and combinations thereof; and (6) from 0 to 5% by weight, preferably from about 0.2% to 5% by weight, more preferably from about 0.5% to about 2.5% by weight, of a polymerizable UV-absorbing or UV/HEVL-absorbing vinylic monomer. The foregoing range combinations are presented with the proviso that the listed components and any additional components add up to 100% by weight.

It should be understood that although in this aspect of the invention various embodiments including preferred, more preferred, even more preferred, and most preferred embodiments of the invention may be described above separately, they can be combined and/or used together in any desirable fashion to arrive at different embodiments of a method of the invention for producing silicone hydrogel contact lenses.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

Example 1

The apparent oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 $cm^3$/min., while a nitrogen stream is passed on the opposite side of the lens at a rate of about 10 to 20 $cm^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where J=oxygen flux [microliters $O_2/cm^2$–minute]
$P_{oxygen} = (P_{measured} - P_{water}$ vapor$) = (\%\ O_2$ in air stream) [mm Hg]=partial pressure of oxygen in the air stream
$P_{measured}$=barometric pressure (mm Hg)
$P_{water}$ vapor=0 mm Hg at about 35° C. (in a dry cell) (mm Hg)
$P_{water}$ vapor=40 mm Hg at about 35° C. (in a wet cell) (mm Hg)
t=average thickness of the lens over the exposed test area (mm)
$Dk_{app}$ is expressed in units of barrers.

The apparent oxygen transmissibility (Dk/t) of the material may be calculated by dividing the apparent oxygen permeability ($Dk_{app}$) by the average thickness (t) of the lens.

The above described measurements are not corrected for the so-called boundary layer effect which is attributable to the use of a water or saline bath on top of the contact lens during the oxygen flux measurement. The boundary layer effect causes the reported value for the apparent Dk of a silicone hydrogel material to be lower than the actual intrinsic Dk value. Further, the relative impact of the boundary layer effect is greater for thinner lenses than with thicker lenses. The net effect is that the reported Dk appear to change as a function of lens thickness when it should remain constant.

The intrinsic Dk value of a lens can be estimated based on a Dk value corrected for the surface resistance to oxygen flux caused by the boundary layer effect as follows.

Measure the apparent oxygen permeability values (single point) of the reference Iotrafilcon A (Focus® N&D® from CIBA VISION CORPORATION) or Iotrafilcon B (AirOptix™ from CIBA VISION CORPORATION) lenses using the same equipment. The reference lenses are of similar optical power as the test lenses and are measured concurrently with the test lenses.

Measure the oxygen flux through a thickness series of Iotrafilcon A or Iotrafilcon B (reference) lenses using the same equipment according to the procedure for apparent Dk measurements described above, to obtain the intrinsic Dk value ($Dk_i$) of the reference lens. A thickness series should cover a thickness range of approximately 100 µm or more. Preferably, the range of reference lens thicknesses will bracket the test lens thicknesses. The $Dk_{app}$ of these reference lenses must be measured on the same equipment as the test lenses and should ideally be measured contemporaneously with the test lenses. The equipment setup and measurement parameters should be held constant throughout the experiment. The individual samples may be measured multiple times if desired.

Determine the residual oxygen resistance value, $R_r$, from the reference lens results using equation 1 in the calculations.

$$R_r = \frac{\sum \left( \frac{t}{Dk_{app}} - \frac{t}{Dk_i} \right)}{n} \quad (1)$$

in which t is the thickness of the test lens (i.e., the reference lens too), and n is the number of the reference lenses measured. Plot the residual oxygen resistance value, $R_r$, vs. t data and fit a curve of the form Y=a+bX where, for the jth lens, $Y_j=(\Delta P/J)_j$ and $X=t_j$. The residual oxygen resistance, $R_r$ is equal to a.

Use the residual oxygen resistance value determined above to calculate the correct oxygen permeability $Dk_c$ (estimated intrinsic Dk) for the test lenses based on Equation 2.

$$Dk_c = t/[(t/Dk_a) - R_r] \quad (2)$$

The estimated intrinsic Dk of the test lens can be used to calculate what the apparent Dk ($Dk_{a\_std}$) would have been for a standard thickness lens in the same test environment based on Equation 3. The standard thickness ($t_{std}$) for Iotrafilcon A=85 µm. The standard thickness for Iotrafilcon B=60 µm.

$$Dk_{a\_std} = t_{std}/[(t_{std}/Dk_c) + R_{r\_std}] \quad (3)$$

Ion Permeability Measurements.

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm²/minute.

Example 2

Synthesis of α,ω-Acrylamide Terminated Polydimethylsiloxane

Solution A. 700 gram of diaminopropyl terminated polydimethylsiloxane (KF8012) from ShinEstu and 1500 mL of hexanes are added in a beaker followed by a short stirring until the mixture is homogenized.

Solution B. 55.20 grams $Na_2CO_3$ is dissolved in 1600 mL of 5% of NaCl aqueous solution.

Solution C. 38.30 gram of acryloyl chloride is dissolved in 100 ml of hexanes.

Solution A and B are combined in a reaction flask equipped with a mechanical stir. Solution C is then slowly added to the reaction flask via an addition funnel over one hour period of time, while the solution in the flask is well stirred. The agitation continued for another hour. 200 mL of saturated NaCl solution is added to the reaction solution, followed by 15 minutes of fast agitation. The agitation is then stopped and phase separation took place. After 30 minutes, the aqueous phase is removed. The organic phase is then washed with 1600 mL of DI water while the solution is stirred at 150-200 rpm for 30 minutes. Stirring is then stopped and the aqueous phase is then removed. Additional water is added and the extraction process is repeated for two more times. After the last washing, the solution is kept in the reactor overnight. The aqueous phase is removed in the following morning. The organic phase is collected and dried using 100 grams of $MgSO_4$ with a gentle stir (~250 rpm) at room temperature (R.T.) for one hour. The solution is filtered and dried using rotavap until <100 gram of hexanes is left. Remove the last part of hexane by vacuum pump till the constant weight.

Example 3

Preparation of CE-PDMS Macromer

In the first step, α,ω-bis(2-hydroxyethoxypropyl)-polydimethylsiloxane (Mn=2000, Shin-Etsu, KF-6001a) is capped with isophorone diisocyanate (IPDI) by reacting 49.85 g of α,ω-bis(2-hydroxyethoxypropyl)-polydimethylsiloxane with 11.1 g IPDI in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at about 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM (i.e., CE-PDMS terminated with methacrylate groups).

Alternate Preparation of CE-PDMS Macromer with Terminal Methacrylate Groups 240.43 g of KF-6001 is added into a 1-L reactor equipped with stirring, thermometer, cryostat, dropping funnel, and nitrogen/vacuum inlet adapter, and then dried by application of high vacuum ($2 \times 10^{-2}$ mBar). Then, under an atmosphere of dry nitrogen, 320 g of distilled MEK is then added into the reactor and the mixture is stirred thoroughly. 0.235 g of DBTDL is added to the reactor. After the reactor is warmed to 45° C., 45.86 g of IPDI are added through an addition funnel over 10 minutes to the reactor under moderate stirring. The reaction is kept for 2 hours at 60° C. 630 g of KF-6002 dissolved in 452 g of distilled MEK are then added and stirred until a homogeneous solution is formed. About 0.235 g of DBTDL is added, and the reactor is held at about 55° C. overnight under a blanket of dry nitrogen. The next day, MEK is removed by flash distillation. The reactor is cooled and 22.7 g of IEM are then charged to the reactor followed by about 0.235 g of DBTDL. After about 3 hours, an additional 3.3 g of IEM are added and the reaction is allowed to proceed overnight. The following day, the reaction mixture is cooled to about 18° C. to obtain CE-PDMS macromer with terminal methacrylate groups.

Examples 4-14

Preparation of Lens Formulations

Lens formulations listed in Table 1 are prepared as follows. To a 20 mL of glass vial with a stirring bar a targeted amount of components is added. The solution is then mixed at room temperature on a stirring plate for about 1 hour.

TABLE 1

| Example | Composition (% by weight) | | | | |
|---|---|---|---|---|---|
| | PDMS crosslinker | Tris component | DMA | T-AA | DC 1173 |
| 4 | PDMS-Dam 21% | SiGMA 31% | 23% | 24% | 1% |
| 5 | PDMS-Dam 21% | Tris-Am 31% | 23% | 24% | 1% |
| 6 | CE-PDMS 32% | Tris-Am 21% | 23% | 23% | 1% |
| 7 | CE-PDMS 51% | N/A | 24% | 24% | 1% |
| 8 | PDMS-Dam 21% | Bis-Am 31% | 23% | 24% | 1% |
| 9 | PDMS-Dam 21% | Bis-Am 31% | 23% | 24% | 1% |
| 10 | PDMS-Dam 21% | Bis-AM 31% | 23% | 24% | 1% |
| 11 | PDMS-DMa 21% | N-Methyl Bis-AM 31% | 23% | 24% | 1% |
| 12 | PDMS-DAm | N-Methyl Bis-AM 31% | 23% | 24% | 1% |
| 13 | PDMS-Dam 21% | Bis-AM 31% | 23% | 24% | 1% |
| 14 | PDMS-Dam 21% | Bis-AM 31% | 23% | 24% | 1% |

Chemicals:
T-AA: tert-amyl alcohol;
PDMS-Dam: α,ω-acrylamide terminated polydimethylsiloxane crosslinker prepared in Example 2;
CE-PDMS: chain-extended polydimethylsiloxane crosslinker prepared in Example 3;
PDMS-DMa: α,ω-bis(methacryloxyethoxypropyl)-terminated polydimethylsiloxane (DMS-R18, Gelest)
SIGMA: (3-methacryloxy-2-hydroxypropoxy)propylbis(trimethylsiloxy)methylsilane (Gelest)

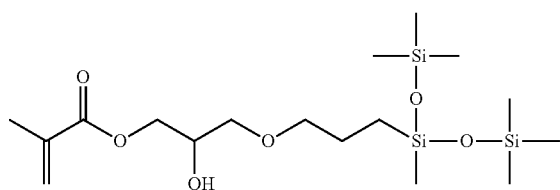 [SMILES: C=C(C)C(=O)OCC(O)COCCC[Si](C)(O[Si](C)(C)C)O[Si](C)(C)C]

DMA: N,N-dimethylacrylamide
DC 1173: 2-Hydroxy-2-methyl-1-phenyl-propan-1-one
Tris-Am: 3-acrylamidopropyltris(trimethylsiloxy)silane (or N-[tris(trimethylsiloxy)-silylpropyl]acrylamide).

Bis-Am: 3-acrylamidopropylbis(trimethylsiloxy)methylsilane

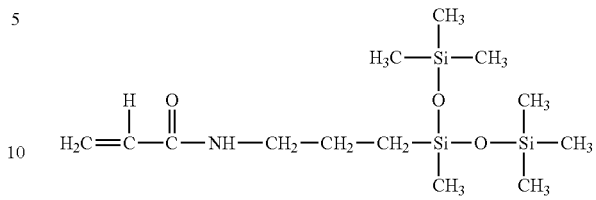

N-Methyl Bis-Am: 3-N-methyl acrylamidopropylbis(trimethylsiloxy)methylsilane

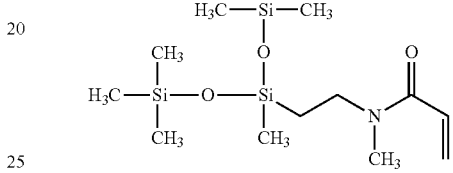

Formulation Curing

The lens formulation of Example 4 is dosed to polypropylene (PP) molds and cured in UV box with a light intensity of 4-6 mW/cm$^2$ for 20 minutes.

The lens formulation of one of Examples 5 to 13 is dosed to PP molds and cured with a light intensity of 16 mW/cm$^2$ with 330 nm cut-off filter for 20-30 seconds.

De-Molding

Prior to lens mold opening, the molds containing lenses are soaked in di-ionized (DI) water for about 2 hours. These molds are then opened and kept soaking in DI water overnight. To get the lenses off the molds, the molds with the lens are soaked in isopropanol/water (50/50 V/V) mixture prior to being removed by tweezers.

Lens extraction for Examples 4-7 is conducted in the following 9 steps: 22 seconds in methyl ethyl ketone (MEK) (step 1), 78 seconds in MEK (step 2), 224 seconds in MEK (step 3), followed by 56 s in DI water (steps 4-9).

Lens extraction for Examples 8-14 is conducted in the following 5 steps: 3 hours in isopropanol (IPA) (step 1), 10 minutes in IPA (step 2), 30 minutes in DI water (step 3), 10 minutes in DI water (step 4), and 2 minutes in DI water (step 5).

For Examples 4-8 and 11-13, extracted lenses are stored in phosphate-buffered saline (PBS) in polypropylene shells at pH 7.2. For examples 9 and 14, extracted lenses are stored in phosphate-buffered saline (PBS) in polypropylene shells at pH 6.8. For example 10, extracted lenses are stored in phosphate-buffered saline (PBS) in polypropylene shells at pH 6.2. For Example 9, 10 and 14, the pH of the saline is adjusted by adding 0.1 N HCl aqueous solution to the PBS saline of pH 7.2.

Autoclave

The autoclave is done at 121° C. Each cycle of autoclave takes 30 minutes. 15 lenses are subject to 1 cycle of autoclave. 15 lenses are subjected to 7 cycles of autoclave. 15 lenses are subjected to 13 cycles of autoclave. 15 lenses are subjected to 19 cycles of autoclave. Those lenses are used for lens property characterization. Results are reported in Table 2.

Stability at 95° C.

Lenses prepared in Examples 13 and 14 are packed in the PBS saline in the glass vial with pH 7.2 (Ex. 13) and pH 6.8 (Ex. 14) respectively. The lenses are stored in oven with the set temperature of 95° C. At the designated time intervals, lenses are removed from the oven and subject to mechanical and diameter measurement. The results are reported in Table 3.

(3) third repeating units derived from α,ω-acrylamide terminated polydimethylsiloxane or α,ω-bis(methacryloxyethoxypropyl)-terminated polydimethylsiloxane, wherein the soft contact lens has a relatively-long thermal stability as characterized by having an autoclave-induced change in elastic modulus,

TABLE 2

| Example | | EX. 4 | EX. 5 | EX. 6 | EX. 7 | EX. 8 | Ex. 9 | EX. 10 | Ex. 11 | Ex. 12 |
|---|---|---|---|---|---|---|---|---|---|---|
| Appearance | | Clear | Clear | Clear | Clear | Clear | Clear | Clear | Clear | Clear |
| pH of Storage PBS | | 7.2 | 7.2 | 7.2 | 7.2 | 7.2 | 6.8 | 6.2 | 7.2 | 7.2 |
| $O_2$ Permeability | | 122 | 173 | | | 156 | | | | 137 |
| Ion Permeability | | 0.4 | 5.3 | | | 5.8 | | | | 2.3 |
| Water Content (wt./wt. %) | | 34 | 28 | | | 29 | | | | 28 |
| Lens diameter (mm) | 1 × AC | 15.03 ± 0.06 | 14.60 ± 0.04 | X | 14.70 ± 0.07 | 14.60 ± 0.07 | 14.59 ± 0.05 | 14.59 ± 0.05 | 14.27 ± 0.08 | 14.70 ± 0.04 |
| | 7 × AC | 15.09 ± 0.03 | X | X | 14.72 ± 0.13 | 14.63 ± 0.06 | 14.60 ± 0.06 | 14.62 ± 0.06 | 14.30 ± 0.04 | 14.72 ± 0.06 |
| | 13 × AC | 15.13 ± 0.06 | X | X | 14.81 ± 0.09 | 14.60 ± 0.04 | 14.64 ± 0.05 | 14.63 ± 0.05 | 14.34 ± 0.13 | 14.75 ± 0.04 |
| | 19 × AC | 15.11 ± 0.11 | 14.64 ± 0.07 | X | 14.83 ± 0.08 | 14.65 ± 0.09 | 14.64 ± 0.06 | 14.62 ± 0.06 | 14.30 ± 0.04 | 14.71 ± 0.05 |
| Lens Modulus (MPa) | 1 × AC | 0.61 ± 0.03 | 0.55 ± 0.01 | 0.62 ± 0.01 | 1.58 ± 0.01 | 0.35 ± 0.02 | 0.37 ± 0.01 | 0.36 ± 0.01 | 0.45 ± 0.01 | 0.51 ± 0.02 |
| | 7 × AC | 0.61 ± 0.03 | X | 0.64 ± 0.01 | 1.50 ± 0.05 | 0.35 ± 0.02 | 0.36 ± 0.03 | 0.36 ± 0.02 | 0.45 ± 0.02 | 0.51 ± 0.03 |
| | 13 × AC | 0.60 ± 0.01 | 0.60 ± 0.01 | 0.75 ± 0.01 | 1.42 ± 0.07 | 0.37 ± 0.01 | 0.36 ± 0.00 | 0.36 ± 0.00 | 0.44 ± 0.02 | 0.52 ± 0.02 |
| | 19 × AC | 0.60 ± 0.02 | 0.70 ± 0.04 | 0.93 ± 0.01 | 1.36 ± 0.00 | 0.45 ± 0.03 | 0.37 ± 0.03 | 0.36 ± 0.01 | 0.47 ± 0.03 | 0.52 ± 0.01 |

TABLE 3

Properties Measured after Being stored at 95° C. (equivalent Shelf-Life at room temperature)

| | Lens Diameter (mm) | | | Lens Modulus (MPa) | | |
|---|---|---|---|---|---|---|
| Example | 0 week | 1 week (2.5 years) | 2.5 weeks (>6 years) | 0 week | 1 week (2.5 years) | 2.5 weeks (>6 years) |
| 13 | 14.54 ± 0.04 | 14.60 ± 0.03 | 14.53 ± 0.09 | 0.37 ± 0.01 | 0.39 ± 0.01 | 0.83 ± 0.04 |
| 14 | 14.54 ± 0.04 | 14.57 ± 0.03 | 14.58 ± 0.13 | 0.37 ± 0.01 | 0.35 ± 0.02 | 0.50 ± 0.02 |

Note: The formula below is used to estimate the equivalent shelf-life at room temperature, which could deviate from the actual room temperature shelf-life.

$$\text{Shelf-life} = t \times 2^x; \quad x = 2^{\frac{(95 - 25° C.)}{10° C.}}$$

$$\left| \frac{\overline{EM_{19AC}} - \overline{EM_{1AC}}}{\overline{EM_{1AC}}} \right|,$$

of about 5% or less, wherein $\overline{EM_{1AC}}$ is the averaged after-one-autoclave elastic modulus of the soft contact lens and is obtained by averaging the elastic modulus of 15 soft contact lenses measured after being autoclaved one sole time for 30 minutes at 121° C. in a phosphate buffered saline at a pH of 7.20±0.05 and $\overline{EM_{19AC}}$ is the averaged after-19-autoclaves elastic modulus of the soft contact lens and is obtained by averaging the elastic modulus of 15 soft contact lenses measured after being stored and autoclaved 19 times each for 30 minutes at 121° C. in a phosphate buffered saline at a pH of 7.20±0.05.

What is claimed is:

1. A soft contact lens comprising a silicone hydrogel material comprising:

(1) first repeating units derived from N,N-dimethylacrylamide;

(2) second repeating units derived from a siloxane vinylic monomer of formula (Ia)

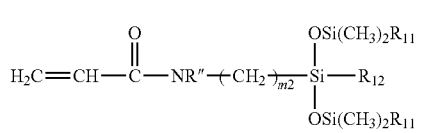

(Ia)

in which R″, $R_{11}$ and $R_{12}$ are methyl and m2 is 3; and

2. The soft contact lens of claim 1, having: an oxygen permeability (Dk) of at least about 40 barrers; a water content of from about 20% to about 75% by weight when fully hydrated; and an elastic modulus of from about 0.2 MPa to about 1.8 MPa.

3. The soft contact lens of claim 1, wherein the silicone hydrogel material further comprises fifth repeating units derived from a UV-absorbing vinylic monomer.

4. The soft contact lens of claim 2, wherein the silicone hydrogel material further comprises fifth repeating units derived from a UV-absorbing vinylic monomer.

5. A soft contact lens comprising a silicone hydrogel material, wherein the silicone hydrogel material is a polymerization product of a lens formulation comprising:

(1) from about 5% to about 60% by weight of N,N-dimethylacrylamide;

(2) from about 5% to about 50% by weight of a siloxane vinylic monomer of formula (Ia);

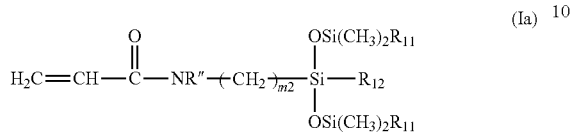

in which R", $R_{11}$ and $R_{12}$ are methyl and m2 is 3;

(3) from about 5% to about 50% by weight of α,ω-acrylamide terminated polydimethylsiloxane or α,ω-bis(methacryloxyethoxypropyl)-terminated polydimethylsiloxane;

(4) from about 0.05% to about 1.5% by weight of a photoinitiator;

(5) from 0 to 4% by weight of a crosslinking agent selected from the group consisting of N,N'-methylene-bis-(meth)acrylamide, N,N'-ethylene-bis-(meth)acrylamide, N,N'-dihydroxyethylene-bis-(meth)acrylamide, 1,3-bis(acrylamidopropyl)-1,1,3,3-tetramethyldisiloxane, 1,3-bis(methacrylamidopropyl)-1,1,3,3-tetramethyldisiloxane, and combinations thereof; and (6) from 0 to 5% by weight of a polymerizable UV-absorbing or UV/High-Energy-Violet-Light-absorbing vinylic monomer, provided that the above-listed components and any additional components add up to 100% by weight, wherein the soft contact lens has a relatively-long thermal stability as characterized by having an autoclave-induced change in elastic modulus, $$\left| \frac{\overline{EM_{19AC}} - \overline{EM_{1AC}}}{\overline{EM_{1AC}}} \right|,$$

of about 5% or less, wherein $\overline{EM_{1AC}}$ is the averaged after-one-autoclave elastic modulus of the soft contact lens and is obtained by averaging the elastic modulus of 15 soft contact lenses measured after being autoclaved one sole time for 30 minutes at 121° C. in a phosphate buffered saline at a pH of 7.20±0.05 and $\overline{EM_{19AC}}$ is the averaged after-19-autoclaves elastic modulus of the soft contact lens and is obtained by averaging the elastic modulus of 15 soft contact lenses measured after being stored and autoclaved 19 times each for 30 minutes at 121° C. in a phosphate buffered saline at a pH of 7.20±0.05.

6. The soft contact lens of claim 1, having: an oxygen permeability (Dk) of at least about 40 barrers; a water content of from about 20% to about 75% by weight when fully hydrated; and an elastic modulus of from about 0.2 MPa to about 1.8 MPa.

* * * * *